United States Patent [19]
Touro et al.

[11] Patent Number: 4,734,270
[45] Date of Patent: * Mar. 29, 1988

[54] SULFIDE TREATMENT TO INHIBIT MERCURY ADSORPTION ONTO ACTIVATED CARBON IN CARBON-IN-PULP GOLD RECOVERY CIRCUITS

[76] Inventors: Freddie J. Touro, 61 Park Timbers Dr., New Orleans, La. 70114; Delbert A. Lipps, 948 Cahoula St., Mandeville, La. 70448

[*] Notice: The portion of the term of this patent subsequent to Feb. 23, 2005 has been disclaimed.

[21] Appl. No.: 850,677

[22] Filed: Apr. 11, 1986

[51] Int. Cl.⁴ .............................................. C01G 7/00
[52] U.S. Cl. ....................................... 423/29; 423/30; 423/31; 423/109; 75/2; 75/97 A; 75/101 R; 75/105; 75/118 R
[58] Field of Search ..................... 423/27, 29, 30, 31, 423/109; 75/2, 97 A, 101 R, 105, 118 R

[56] References Cited

U.S. PATENT DOCUMENTS

| | | | |
|---|---|---|---|
| 4,256,707 | 3/1981 | Flynn, Jr. et al. | 75/118 R |
| 4,289,532 | 9/1981 | Matson et al. | 75/118 R |
| 4,528,166 | 7/1985 | McDougall | 75/118 R |
| 4,552,589 | 11/1985 | Mason et al. | 423/29 |
| 4,578,163 | 3/1986 | Kunter et al. | 75/118 R |

*Primary Examiner*—Robert L. Stoll
*Attorney, Agent, or Firm*—Fisher, Christen & Sabol

[57] ABSTRACT

In this invention sulfide compounds are added to mercury and precious metal-containing carbonaceous ore slurries prior to the slurry being processed by a carbon-in-pulp system. The sulfide compound inhibits the mercury from being adsorbed onto the activated carbon by reacting with the mercury to form mercuric sulfide and by inhibiting the dissolution of mercury from the ore. The mercuric sulfide precipitate displays no activity toward the activated carbon. The sulfiding procedure is performed with a sufficient amount of sulfide-providing compound to provide at least about 30 times the stoichiometric amount of sulfide ions required to react with the mercury in the ore slurry.

22 Claims, 1 Drawing Figure

SULFIDE TREATMENT TO INHIBIT MERCURY ADSORPTION ONTO ACTIVATED CARBON IN CARBON-IN-PULP GOLD RECOVERY CIRCUITS

BACKGROUND OF THE INVENTION

1. Field Of The Invention

This invention relates to a process for treating an aqueous ore slurry of a carbonaceous precious metal-containing ore in a cyanide leach, carbon-in-pulp system to inhibit mercury from being adsorbed onto activated carbon. This invention more particularily relates to a process for treating the aqueous ore slurry of a carbonaceous precious metal-containing ore by the addition of sulfide compounds subsequent to completion of an oxidation step and prior to a cyanide leach, carbon-in-pulp adsorption circuit.

2. Description of the Prior Art

Precious metal-containing ores such as gold-containing ores often contain mercury compounds as impurities. The presence of these mercury compounds is undesirable particularly in gold recovery plants using cyanide leach, carbon-in-pulp systems. In such systems both gold and mercury are leached from the ore in the presence of the activated carbon which is in the cyanide leach slurry or pulp. The simultaneous leaching of mercury and gold causes some mercury to be adsorbed onto the activated carbon thereby reducing the surface area of the activated carbon available to adsorb the gold. The competition of mercury and gold during the activated carbon adsorption process increases the amount of activated carbon required to adsorb the leached gold. Another problem associated with the presence of mercury in a gold recovery process is that any mercury not removed during the initial gold processing operation can be present in the intermediate gold product. The presence of mercury in the intermediate gold product can increase the cost of refining the gold concentrate.

U.S. Pat. No. 4,289,532 to Matson, herein incorporated by reference, is illustrative of a gold recovery process using chlorination in a cyanide leach, carbon-in-pulp system. In Matson the recovery of gold from refractory carbonaceous gold-containing ores is accomplished by subjecting an aqueous carbonaceous slurry to an oxidation step which includes an oxygenation step and/or a chlorination step. The oxidized aqueous slurry is simultaneously contacted with a cyanide leach solution and granular activated carbon. The gold contained in the ore is leached from the ore and then adsorbed by the activated carbon. The absorbed gold is then "stripped" or desorbed from the gold-loaded activated carbon. This desorption of gold from the activated carbon is accomplished by the use of a cyanide stripping solution. The Matson process has proven to be a commercially successful gold extraction process. The difficulties encountered with mercury contamination decrease the efficiency of the Matson process.

One effective method for removing mercury compounds from gold recovery systems is to retort the gold concentrate. Mercury is distilled from the gold concentrate during the retorting operation and is collected in a condenser from which the mercury is sold or disposed of in an environmentally safe manner. A retorting operation is costly because of the expensive equipment and large amounts of energy required to conduct the method.

In gold recovery plants utilizing cyanide leach recovery systems, mercury compounds can be precipitated and removed from cyanide solutions by the addition of metal sulfides to the cyanide solutions. U.S. Pat. No. 4,256,707 to Flynn et al. discloses a process for selectively removing mercury from gold-cyanide solutions. A mercuric sulfide precipitate is formed by adding $Ag_2S$, $ZnS$, or $FeS$ to the gold-cyanide solution. The Flynn patent discloses that when sulfide is added to a gold-cyanide solution in an amount less than 1.5 times the stoichiometric amount required to precipitate mercury, the formation of insoluble mercuric sulfide (HgS) is distinctly favored over the formation of other metal sulfides. This selective precipitation of mercuric sulfide (HgS) is performed in a cyanide solution at ambient temperature and atmospheric pressure. The cyanide solutions described in Flynn are typical of those solutions obtained after solid ore particles have been separated from the aqueous phase of ore slurries and after cyanide has been added to the solution. The Flynn patent fails to disclose a pretreatment for precipitating mercury from aqueous ore slurries prior to the removal of the "pulp", which is defined as the solid ore particles in the liquor, or a process that is readily adaptable to cyanide leach, carbon-in-pulp systems.

The industry for extracting gold or other precious metals from carbonaceous ores has increasingly used chlorination processes to oxidize the carbonaceous materials in the ores. This makes the ores more amendable to cyanide leaching. The increase in the number of gold plants using chlorination processes to extract gold has increased the industry's concern over mercury contamination of activated carbon. The industry lacks a process for inhibiting mercury adsorption onto the activated carbon used in cyanide leach, carbon-in-pulp precious metal extraction systems.

SUMMARY OF THE INVENTION

Figure 1:
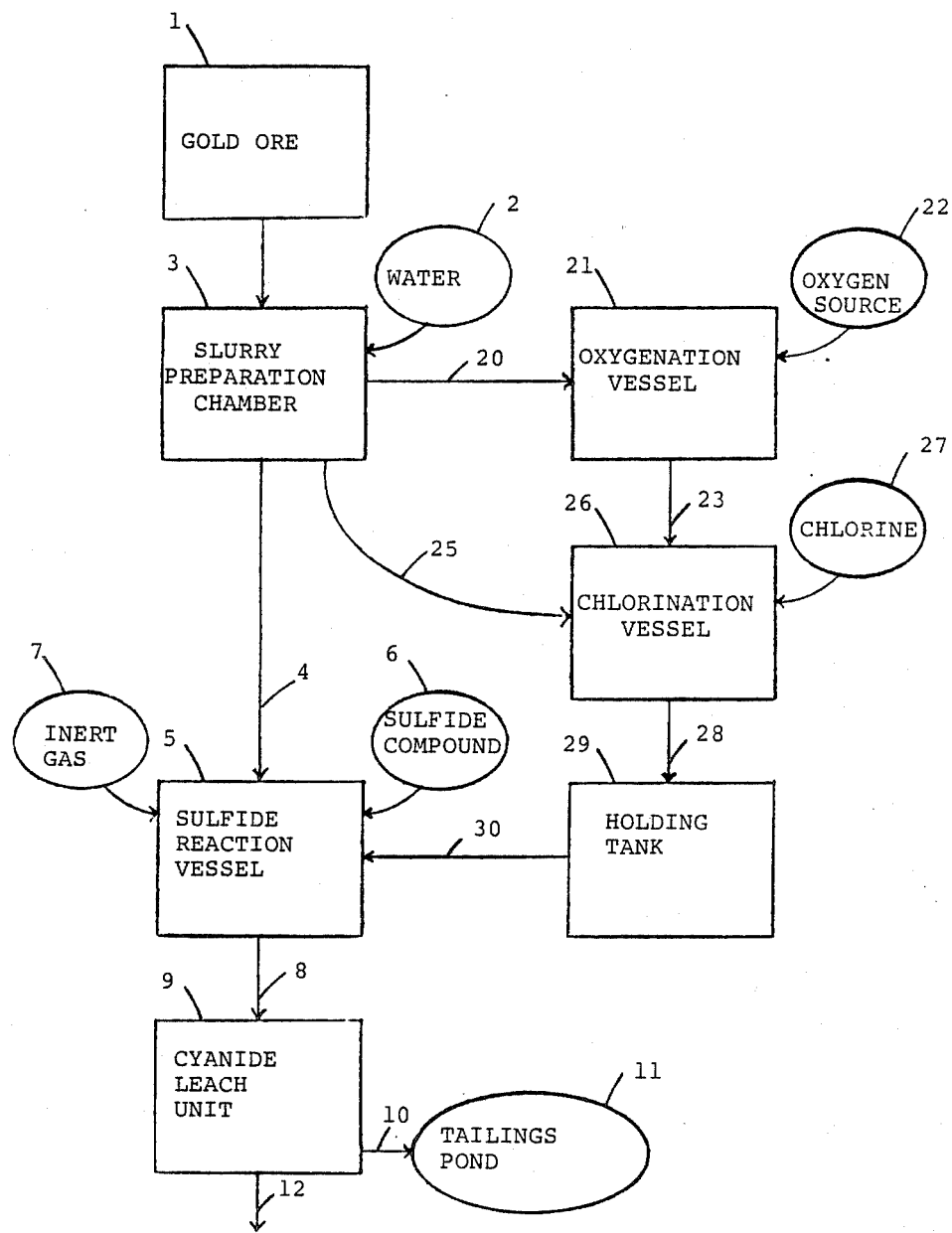
FIG. 1 is a flow diagram illustrating the operation of the process of the present invention in which the aqueous slurry of a precious metal-containing ore is treated with a sulfide compound to inhibit mercury adsorption onto activated carbon.

The present invention is a process for treating the aqueous slurry of a mercury-contaminated, precious metal-containing carbonaceous ore to inhibit the adsorption of mercury onto activated carbon. The slurry is prepared by grinding a mercury and precious metal-containing carbonaceous ore with water to obtain a solids content of between about 40 and about 60 percent by weight. This slurry then undergoes a sulfide reaction procedure whereby a sulfide compound capable of supplying reactive sulfide ions is added to the slurry in an amount equal to at least about 30 times the stoichiometric amount required to chemically precipitate the mercury contained in the slurry. During the sulfide reaction procedure the slurry is desirably agitated and maintained at the existing process temperature of between about 50° F. and about 120° F. The sulfide reaction procedure occurs between about 10 minutes and about 2 hours. The sulfide reaction procedure preferably is performed in vessels or containers in which a blanket of nitrogen or other inert gas is maintained in the vapor space of the vessel or container. The presence of the inert atmosphere prevents oxidation of the sulfide compounds by atmospheric oxygen.

The preferred sulfide compound for use with this invention is a member selected from the group consisting of sodium sulfide ($Na_2S$), sodium hydrosulfide (NaHS), and hydrogen sulfide ($H_2S$). The product of the chemical reaction of the sulfide compound and mercury is a mercuric sulfide (HgS) precipitate which is not adsorbed onto the activated carbon of the cyanide leach, carbon-in-pulp precious metal extration system. The mercuric sulfide (HgS) precipitate is passed with the ore slurry through the cyanide leach circuit and exits the ore processing circuit with the ore tailings or solid ore waste particles. The sulfide reaction procedure also inhibits the adsorption of mercury onto activated carbon by substantially inhibiting the dissolution of mercury from the precious metal-containing ore.

The preferred embodiment of the invention is a process for treating the aqueous slurry of a precious metal-containing ore when oxidation of the ore slurry is required. The ore slurry is subjected to an oxidation procedure which can include an oxygenation procedure and/or a chlorination procedure. When a chlorination procedure is performed, substantial amounts of the excess residual hypochlorite ions formed during the chlorination process are desirably eliminated prior to the sulfide reaction procedure. The slurry is then subjected to a sulfide reaction procedure. In this sulfide reaction procedure a sulfide compound capable of supplying reactive sulfide ions is added to the slurry in an amount equal to at least about 30 times the sum of the stoichiometric amount theoretically necessary or required to chemically precipitate the mercury contained in the slurry.

In this invention the addition of the sulfide compound to the ore slurry is desirably made prior to the slurry entering the cyanide leach circuit. Prior to the slurry entering the cyanide leach circuit neither cyanide nor activated carbon is present in the slurry. After the reaction of mercury and sulfide a simultaneous cyanide leach and carbon-in-pulp adsorption of the precious metal onto activated carbon is performed in the sulfide-containing ore slurry.

An alternative mode for conducting the method of the invention exists for those systems in which the cyanide leach step and the carbon adsorption step are not performed simultaneously. If the cyanide leach step is performed prior to the carbon adsorption step, then the sulfide compound can optionally be added in the cyanide leach step.

In the context of this disclosure, "carbonaceous precious metal-containing ore" denotes a refractory precious metal-containing ore which also contains carbonaceous matter that exhibits the property of inhibiting or substantially reducing the extraction of precious metals from such ore by conventional cyanidation technology.

DETAILED DESCRIPTION OF THE INVENTION

The present invention is a process for treating the aqueous slurry of a precious metal-containing carbonaceous ore. The process includes a sulfide reaction procedure that is preceded by the preparation of an ore slurry. In preparation of the ore slurry a mercury and precious metal-containing carbonaceous ore is ground with water to desirably form a slurry having a solids content of between about 40 percent and about 60 percent by weight. In the sulfide reaction procedure a sulfide compound is added to the slurry in an amount equal to at least about 30 times the stoichiometric amount required to chemically precipitate the mercury contained in the ore slurry. The sulfide reaction procedure occurs in between about 10 minutes and about 2 hours at the existing process temperature of between about 50° F. and about 120° F. The sulfide reaction procedure is desirably conducted under an inert gas atmosphere. The sulfide reaction procedure produces a mercuric sulfide (HgS) precipitate that is passed with the ore slurry through the cyanide leach circuit and exists the precious metal extraction process with the "ore tailings" or solid ore particles. The sulfide reaction procedure prevents the adsorption of mercury onto the subsequently added activated carbon by substantially inhibiting the dissolution of mercury from the precious metal-containing ore and by reacting with the mercury that is dissolved or extracted from the ore before the mercury is adsorbed onto the activated carbon.

The preferred embodiment of the process of this invention includes an oxidation of carbonaceous materials in the ore slurry. The oxidation procedure is performed subsequent to the preparation of the ore slurry and prior to the sulfide reaction procedure. The oxidation procedure can include an oxygenation procedure and/or a chlorination procedure. The use of a chlorination procedure produces hypochlorite ions. Any substantial amount of residual hypochlorite ions is desirably removed prior to the sulfide reaction procedure. Hypochlorite removal is desirable because sulfide ions react with hypochlorite ions that remain in the ore slurry.

The process of this invention substantially inhibits mercury from being adsorbed onto activated carbon. This result is achieved in two ways. First, the dissolution of mercury from the slurried ore particles is substantially inhibited by the addition of sulfides to the aqueous ore slurry. In the absence of sulfide the mercury bound to the ore dissolves into the aqueous slurry and is then rapidly adsorbed onto activated carbon. In the presence of sulfides the mercury has a decreased solubility in the aqueous ore slurry. As a result of the decreased solubility of mercury only a small amount of mercury is available in solution to be adsorbed onto the activated carbon. Secondly, the mercury that is solublized in the aqueous ore slurry reacts with the sulfide ions to form a mercuric sulfide precipitate. A substantial amount of the mercury in solution is precipitated out of solution and prevented from being adsorbed onto the activated carbon.

The preferred sulfide compound, which can be used in this invention, is a member selected from the group consisting of sodium sulfide ($Na_2S$), sodium hydrosulfide (NaHS), and hydrogen sulfide ($H_2S$). The sulfide compound can be a mixture of compounds. The sulfide compound is added to the ore slurry in an amount capable of supplying reactive sulfide ions equal to at least about 30 times the stoichiometric amount theoretically necessary or required to chemically precipitate the mercury contained in the ore slurry. Thus, an ore slurry containing, for example, 0.85 ounces of mercury per ton of ore requires the addition of at least 1.5 pounds of sodium sulfide ($Na_2S$) per ton of ore. Many ores require additions of sulfide ions more than 30 times the stoichiometric amount theoretically necessary for the reaction. For example, very carbonaceous ores can require up to 130 times the stoichiometric amount of sulfide theoretically necessary to react with the mercury present in the ore slurry. The exact amount of sulfide compound required for a particular ore slurry depends on the refractory compounds present in the ore.

The chemical reaction between the sulfide anion and mercury cation is as follows:

$$Hg^{++} + S^= \rightarrow HgS.$$

The product of the reaction between mercury and the sulfide compound is a mercuric sulfide (HgS) precipitate which is not adsorbed by activated carbon. It is desirable to conduct the mercury and sulfide reaction of this invention before any activated carbon is added to the ore slurry. Completion of the mercury and sulfide reaction before the addition of activated carbon prevents or minimizes mercury adsorption onto the activated carbon. The most preferred location for adding the sulfide compound to the ore slurry is prior to the ore slurry entering the cyanide leach circuit. In gold recovery systems, wherein the cyanide leach step is performed separately and prior to the carbon adsorption step, the sulfide compound can optionally be added in the cyanide leach step. When the cyanide leach step includes the addition of oxygen, sulfide is most efficiently added at or near the end of the cyanide leach step. The process of this invention can also be successful, but to a lesser extent, with (1) the simultaneous addition of the sulfide compound and activated carbon to the ore slurry or (2) the addition of the sulfide compound immediately after the addition of the activated carbon.

Slurries of very refractory ores containing large quantities of carbonaceous matter require an oxidation procedure to make the ore slurry amenable to subsequent cyanidation procedures. The oxidation procedure can optionally include an oxygenation procedure before a chlorination procedure. At the completion of the chlorination procedure some residual hypochlorite ions remain in the ore slurry. Hypochlorite ions are very reactive to sulfide compounds. It is desirable to remove the excess hypochlorite ions by any conventional means such as a holding step wherein the slurry is retained in a holding tank until the hypochlorite ions pass from the slurry to the atmosphere or by air sparging.

The preferred embodiment of this invention is directed to the recovery of gold. Gold is representative of the behavior of other precious metals. The process of this invention is compatible with extraction processes for a variety of precious metals. The description of this invention in regard to the extraction of gold as a precious metal is not intended to limit this invention to the extraction of gold.

FIG. 1 illustrates the process steps for extracting gold from mercury-containing ores having varying degrees of refractory material. A gold-containing ore 1 is transferred to a slurry preparation chamber 3 where the ore particles are reduced, if necessary, to a specified size classification by grinding or some other conventional particle size reduction technique. Water 2 is added to the slurry preparation chamber 3 in an amount sufficient to prepare an aqueous ore slurry with a solids content of between about 40 percent and about 60 percent by weight.

A low refractory mercury and gold-containing ore which does not require an oxidation procedure prior to conducting a cyanide leach circuit is processed by transferring the ore slurry through a line 4 directly to a sulfide reaction vessel 5. A sulfide compound 6 is added to the sulfide reaction vessel 5. The sulfide reaction vessel 5 can be a tank or other vessel. The sulfide reaction vessel 5 desirably has a sufficient volume to retain the stream flow for an average of between about 10 minutes and about two hours when a continuous flow operation is performed. Preferably a minimum time of about one hour is desirable for conducting the reaction of this invention. The sulfide reaction step can be performed in either a batch operation or a continuous flow operation. There are no volume restrictions on the sulfide reaction vessel when a batch operation is performed. The slurry is maintained at the existing process temperature of between about 50° F. and about 120° F. in the sulfide reaction vessel 5. Moderate agitation of the slurry within the sulfide reaction vessel 5 is maintained during the reaction period. An inert gas 7 is injected into the vapor space of the sulfide reaction vessel 5. An inert gas blanket is maintained in the vapor space of the sulfide reaction vessel 5 to prevent the oxidation of the sulfide compounds 6 by atmospheric oxygen.

The mercuric sulfide (HgS) precipitate and the ore slurry are passed from the sulfide reaction vessel 5 through a line 8 to a cyanide leach unit 9. The cyanide leach unit 9 is fed by means for supplying a cyanide ion providing compound (not shown) and means for supplying granular activated carbon (not shown). Gold is simultaneously leached by the cyanide ions from the ore and adsorbed onto the activated carbon in the ore slurry or pulp. The leached ore and mercuric sulfide (HgS) precipitate exit the cyanide leach unit 9 through line 10 to a tailings pond 11. The activated carbon containing the adsorbed gold exits the cyanide leach unit 9 through a line 12 and is forwarded to a conventional gold stripping and recovery process (not shown).

The preferred embodiment of the present invention includes a process for treating a refractory mercury and gold-containing ore that requires an oxidation procedure prior to the cyanide leach circuit. The process for treating such ores is also illustrated in FIG. 1. A very refractory ore slurry from the slurry preparation chamber 3 is fed through the line 20 to one or more oxygenation vessels 21 wherein an oxygen-containing gas such as air or oxygen is supplied by an oxygen source 22. This oxygenation procedure is performed on very refractory ores to reduce the amount of chlorine that is required in a subsequent chlorination procedure.

Some refractory ores do not require an oxygenation procedure before a chlorination procedure to make their ore slurry amenable to a subsequent cyanide leach procedure. With such ores the ore slurry can be passed through a line 25 directly to one or more chlorination vessels 26. When an oxygenation procedure is required the ore slurry is passed through a line 23 to a chlorination vessel 26.

Chlorine gas or a chlorine providing compound is fed to the chlorination vessel 26 from a chlorine source 27. Chlorine entering the chlorination vessel 26 is converted immediately to hypochlorite. The conversion of chlorine to hypochlorite occurs at the existing or unadjusted slurry pH. Hypochlorite oxidizes the refractory carbonaceous materials in the ore slurry.

The chlorinated ore slurry is passed from the chlorination vessel through a line 28 to a holding tank 29 wherein the chlorinated ore slurry is held for a period of time sufficient to eliminate the excess hypochlorite ions in the ore slurry. A holding time of two to three hours is typically required to allow natural decay of the hypochlorite ions to occur. The ore slurry is next passed through line 30 to the sulfide reaction vessel 5. The mercury and sulfide reaction and subsequent cyanide leach reaction are conducted as described above.

The following examples illustrate the effectiveness of the process of the invention and are not intended to limit the invention.

EXAMPLE I

This example represents the preferred embodiment of the invention. The ore samples used in this example were taken from the Jerritt Canyon gold mine near Elko, Nev. The dry ore was analyzed and found to contain an average of 0.245 ounces of gold per ton and 0.85 ounces of mercury per ton. The total carbon content of the sample was 6.5 percent by weight and the organic carbon content was 0.68 percent by weight. Ores which have carbon contents of this nature are considered "very refractory" to conventional cyanidation processes. In this example, both oxygenation and chlorination were used to pretreat the slurried ore prior to entering a cyanide leach, carbon-in-pulp system.

The ore was first ground to a particle size that passed through a U.S. Number 100 mesh screen. A slurry with a 50 percent solids content by weight was prepared from the ground ore by slurrying 2200 grams of the ground ore with 2200 grams of water. The slurry was then divided into two equal portions and each portion was oxygenated in a 4 liter stainless steel test pot using the following procedure. The oxygenation procedure included the addition of 55 grams of soda ash to the slurry. The addition of an alkaline material, such as soda ash, to adjust the pH of the ore slurry is the usual procedure in oxygenation processes. The ore slurry was agitated using a T-line Laboratory stirrer, Model 106, with a 3 inch diameter pitchblade impeller. The impeller was rotated at about 700 revolutions per minute. Oxygen was provided by injecting air into the ore slurry through ¼ inch stainless steel tubing attached to the test pot at a point near the bottom of the test pot. The rate of air injection was 643 milliliters per minute. The temperature of the ore slurry was maintained at 180° F. during oxygenation.

Following oxygenation, 3.3 liters of the oxygenated ore slurry were collected, cooled to a temperature of 120° F., and chlorinated for nine hours at a temperature of 120° F. A stainless steel 4 liter test pot and a stirrer identical in design to the one used in the oxygenation step were used in this chlorination procedure. Gaseous chlorine from a pressurized cylinder was injected into the slurry at the same location and using the same type of stainless steel tubing as described above. The rate of chlorine injection was controlled by periodic titration using the standard Mohr method. The titration of chlorine into the ore slurry averaged 280 milliliters per minute. This chlorination procedure follows general industry practice.

Following chlorination, the slurry was held overnight and cooled to a temperature of 80° F. Water was added to dilute the ore slurry to a solids content of 45 percent by weight. The dilution of the ore slurry sample simulates the slurry conditions of a commercial gold recovery plant which mines and recovers the ore used in this example. The pH of the slurry was then adjusted to 10.4 using lime. The chlorinated slurry was tested for hypochlorite prior to entering the sulfide reaction step and found to have none. The absence of hypochlorite was a result of natural decay from the slurry sitting overnight. In continuous gold recovery processes used in the industry, some hypochlorite is usually present and can be eliminated as described in the specification.

A sample of 1410 grams of the oxidized slurry was then placed in a 2 liter glass beaker covered with a Teflon ® watch glass. Varying amounts of powdered sodium sulfide ($Na_2S$) were added to the slurry as listed in Table I. The ore slurry sample was continually stirred with the same type stirrer as that used in the oxidation steps described above. The slurry temperature was maintained at 80° F. during the test. An inert nitrogen atmosphere was maintained in the vapor space of the beaker. The nitrogen atmosphere was maintained by slowly injecting nitrogen gas into the vapor space of the beaker from a pressurized cylinder. Stainless steel tubing was used to inject the nitrogen gas into the ore slurry contained in the glass beaker. The reaction time allowed for each test was one hour.

Following the sulfiding procedure, the watch glass covering the test beaker was removed and 0.83 grams of sodium cyanide (NaCN) plus 20 grams of Westates activated carbon were added to the slurry. The slurry was then agitated for 24 hours while being maintained at a temperature of 80° F. Samples of the activated carbon were then analyzed for mercury. The results are shown in Table I.

TABLE I

EFFECT OF SULFIDE TREATMENT ON THE ADSORPTION OF MERCURY ONTO ACTIVATED CARBON

| Sample* Number | Amount $Na_2S$ Added (pounds per ton) | Mercury Retained On Carbon (parts per million) |
|---|---|---|
| 1 | 0.0 | 570 |
| 2 | 1.0 (44 × stoichiometric) | 260 |
| 3 | 2.0 (88 × stoichiometric) | 170 |
| 4 | 3.0 (132 × stoichiometric) | 21 |

*The results for Sample 1 are provided for comparative purposes only.

The results of this example as illustrated in Table I demonstrate that the amount of mercury retained on carbon decreases as the amount of sulfide used in the reaction added is increased.

EXAMPLE II

This example illustrates the effect of varying retention or reaction times between the sulfide addition to the ore slurry and the contact of the ore slurry with the cyanide leach, carbon-in-pulp system or circuit.

The ore samples used in this example were obtained from the same gold mine that provided the ore samples used in Example I. The mercury content of the ore used in this example was analyzed and found to contain 1.13 ounces of mercury per ton of the ore. The procedure used in preparing the samples of this example was the same as the procedure used in Example I with the following exceptions. The solids content of the test slurries was 47 percent by weight. The simultaneous cyanide leach, carbon-in-pulp adsorption time of this example was 120 minutes. The sulfide retention times for the samples was varied to accomplish the objectives of the test. The results of this example are in Table II.

TABLE II

EFFECT OF SULFIDE RETENTION TIME ON THE AMOUNT OF MERCURY ADSORBED ONTO ACTIVATED CARBON

| Sample Number | Na$_2$S (pounds per ton) | Na$_2$S Retention Time (Minutes) | Cyanide Leach Step Retention Time (Minutes) | Mercury Retained on Carbon (ppm)* |
|---|---|---|---|---|
| 1 | 2.6 (86 × stoichiometric) | 10 | 120 | 71 |
| 2 | 2.6 (86 × stoichiometric) | 30 | 120 | 82 |
| 3 | 2.6 (86 × stoichiometric) | 60 | 120 | 66 |

*ppm = parts per million

As illustrated by the results in Table II, there is no significant difference in the amount of mercury adsorption onto the activated carbon for different retention times. Ten minutes with adequate mixing is a sufficient amount of time for conducting a mercury and sulfide reaction.

EXAMPLE III

This example illustrates the effect of varying the order of adding sulfides and activated carbon to the ore slurry on the amount of mercury adsorbed onto the activated carbon used in the system.

The ore samples used in this example were obtained from the same gold mine that provided the ore samples used in Example I. The procedure of this example was the same as that of Example I with the following exceptions. The order of performing the sulfide reaction procedure and the simultaneous cyanide leach carbon-in-pulp adsorption procedure was reversed. The cyanide leach, carbon-in-pulp adsorption procedure was performed in this example before the sulfide reaction step. The cyanide leach, carbon-in-pulp adsorption procedure was performed with no sulfide present and lasted 120 minutes. The sulfide reaction time was held at 30 minutes. The results of this example are in Table III.

TABLE III

EFFECT ON MERCURY ADSORPTION EFFICIENCY OF PERFORMING CYANIDE LEACH STEP PRIOR TO THE SULFIDE REACTION STEP

| Na$_2$S (pounds per ton) | Length of Cyanide Leach Step (Minutes) | Na$_2$S Retention Time (Minutes) | Mercury Retained on Carbon (ppm)* |
|---|---|---|---|
| 3.9 (129 × stoichiometric) | 120 | 60 | 390 |

*ppm = parts per million

This example illustrates the effects of varying the order of the sulfide reaction procedure and the cyanide leach, carbon-in-pulp adsorption procedure of the invented process. As illustrated by the comparison of the results of this example to the results of Example I, less mercury is adsorbed when the sulfide compound is added to the ore slurry prior to the addition of activated carbon than occurs when the addition of the sulfide compound is subsequent to the addition of activated carbon.

EXAMPLE IV

This example illustrates the effect of varying the order of the addition to an ore slurry of a sulfide compound and a cyanide compound prior to the addition of activated carbon.

The ore samples used in this example were obtained from the same gold mine that provided ore samples used in Example I. The procedure of this example was the same as that used in Example I with the exception that activated carbon was not added to the ore slurry during the cyanide leach procedure. The activated carbon was added after the sulfide reaction procedure. A cyanide compound was added to the ore slurry and a cyanide leach procedure was conducted without activated carbon present in the ore slurry. This was followed by a sulfide addition and reaction procedure and then an activated carbon addition and adsorption procedure.

The mercury retained on the carbon was analyzed and found to be 66 parts per million. This was about the same amount of mercury retained in Example I and Example II. This example, when compared with the results of Example III, illustrates that the order of the addition of the cyanide compound and the sulfide compound is immaterial to the working efficiency of the invention. It is important that the sulfide reaction procedure precede the carbon addition and adsorption procedure. When the activated carbon is added prior to the sulfide compound the efficiency of the process is adversely affected.

What is claimed is:

1. A process for treating a mercury-contaminated, precious metal-containing ore slurry comprising:
   (a) reacting sulfide anions in an aqueous ore slurry of a mercury and precious metal-containing carbonaceous ore, said sulfide anions being added in an amount equal to at least about 30 times the stoichiometric amount required to react with said mercury contained in said ore slurry and being provided by a sulfide compound that is a member selected from the group consisting of sodium sulfide, sodium hydrosulfide, and hydrogen sulfide; and
   (b) conducting a simultaneous cyanide leach and carbon-in-pulp adsorption of said precious metal from said carbonaceous ore in said sulfide-containing ore slurry.

2. The process according to claim 1, wherein said reacting of said sulfide anions and said mercury is performed for between about 10 minutes and about 2 hours.

3. The process according to claim 2, wherein said aqueous ore slurry is at a temperature of between about 50° F. and about 120° F.

4. The process according to claim 3, wherein said ore slurry has a solids content between about 40 percent nd about 60 percent by weight.

5. The process according to claim 4, wherein said precious metal is gold.

6. A process for treating a mercury-contaminated, precious metal-containing ore slurry comprising:
   (a) grinding a mercury and precious metal-containing carbonaceous ore with water to form an aqueous ore slurry;
   (b) oxidizing said aqueous ore slurry wherein said ore slurry is oxidized by hypochlorite ions;

(c) eliminating residual hypochlorite ions in said aqueous ore slurry;

(d) reacting sulfide anions in said oxidized ore slurry, said sulfide anions being in an amount at least about 30 times the stoichiometric amount required to react with said mercury contained in said aqueous ore slurry and being provided by a sulfide compound that is a member selected from the group consisting of sodium sulfide, sodium hydrosulfide, and hydrogen sulfide; and (e) conducting a simultaneous cyanide leach and carbon-in-pulp adsorption of said precious metal from said carbonaceous ore in said sulfide-containing ore slurry.

7. The process according to claim 6, wherein said oxidizing of said ore slurry includes oxygenating said ore slurry with an oxygen-containing gas before said ore slurry is oxidized by said hypochlorite ions.

8. The process according to claim 6 wherein said ore slurry has a solids content between about 40 percent and about 60 percent by weight.

9. The process according to claim 7, wherein said reacting of said sulfide anions and said mercury is performed for between about 10 minutes and about 2 hours.

10. The process according to claim 9, wherein said aqueous ore slurry is at a temperature of between about 50° F. and about 120° F. during said reacting with said sulfide anions.

11. The process according to claim 10, wherein said precious metal is gold.

12. A process for treating a mercury-contaminated, precious metal-containing ore slurry comprising:

(a) conducting a cyanide leach of an aqueous ore slurry of a mercury and precious metal-containing ore;

(b) reacting sulfide anions in said aqueous ore slurry, said sulfide anions being added in an amount equal to at least about 30 times the stoichiometric amount required to react with said mercury contained in said ore slurry and being provided by a sulfide compound that is a member selected from the group consisting of sodium sulfide, sodium hydrosulfide, and hydrogen sulfide; and (c) conducting a carbon-in-pulp adsorption of said precious metal from said carbonaceous ore in said sulfide-containing ore slurry.

13. The process according to claim 12, wherein said reacting of said sulfide anions and said mercury is performed for between about 10 minutes and about 2 hours.

14. The process according to claim 13, wherein said aqueous ore slurry is at a temperature of between about 50° F. and about 120° F.

15. The process according to claim 14, wherein said ore slurry has a solids content between about 40 percent and about 60 percent by weight.

16. The process according to claim 15, wherein said precious metal is gold.

17. A process for treating a mercury-contaminated, precious metal-containing ore slurry comprising:

(a) grinding a mercury and precious metal-containing carbonaceous ore with water to form an aqueous ore slurry;

(b) oxidizing said aqueous ore slurry wherein said ore slurry is oxidized by hypochlorite ions;

(c) eliminating residual hypochlorite ions in said aqueous ore slurry;

(d) conducting a cyanide leach of said aqueous ore slurry;

(e) reacting sulfide anions in said leached ore slurry, said sulfide anions being in an amount at least about 30 times the stoichiometric amount required to react with said mercury contained in said aqueous ore slurry and being provided by a sulfide compound that is a member selected from the group consisting of sodium sulfide, sodium hydrosulfide, and hydrogen sulfide; and (f) conducting a carbon-in-pulp adsorption of said precious metal from said carbonaceous ore in said sulfide-containing ore slurry.

18. The process according to claim 17, wherein said oxidizing of said ore slurry includes oxygenating said ore slurry with an oxygen-containing gas before said ore slurry is oxidized by said hypochlorite ions.

19. The process according to claim 17, wherein said

20. The process according to claim 18, wherein said reacting of said sulfide anions and said mercury is performed for between about 10 minutes and about 2 hours.

21. The process according to claim 20, wherein said aqueous ore slurry is at a temperature of between about 50° F. and about 120° F. during said reacting with said sulfide anions.

22. The process according to claim 21, wherein said precious metal is gold.

* * * * *

UNITED STATES PATENT AND TRADEMARK OFFICE
CERTIFICATE OF CORRECTION

PATENT NO. : 4,734,270

DATED : March 29, 1988

INVENTOR(S) : Touro et al.

It is certified that error appears in the above-identified patent and that said Letters Patent is hereby corrected as shown below:

On the Title Page add Item [73]

Assignee: FREEPORT MINERALS COMPANY
New Orleans, Louisiana

Signed and Sealed this

Twelfth Day of July, 1988

*Attest:*

DONALD J. QUIGG

*Attesting Officer*   *Commissioner of Patents and Trademarks*